United States Patent [19]

Dallavia, Jr.

[11] Patent Number: 4,526,953

[45] Date of Patent: Jul. 2, 1985

[54] MODIFIED SILICONE RELEASE COATING COMPOSITIONS

[75] Inventor: Anthony J. Dallavia, Jr., Macon, Ga.

[73] Assignee: General Electric Company, Waterford, N.Y.

[21] Appl. No.: 538,093

[22] Filed: Oct. 3, 1983

[51] Int. Cl.³ .............................................. C08G 77/06
[52] U.S. Cl. ........................................ 528/15; 528/31; 528/32; 524/861; 524/862
[58] Field of Search ............................ 528/15, 31, 32; 524/861, 862

[56] References Cited

U.S. PATENT DOCUMENTS

| | | | |
|---|---|---|---|
| 3,159,601 | 12/1964 | Ashby | 528/31 |
| 3,159,662 | 12/1964 | Ashby | 528/31 |
| 3,220,972 | 11/1965 | Lamoreaux | 260/46.5 |
| 3,418,353 | 12/1968 | Brown | 260/448.2 |
| 3,715,334 | 2/1973 | Karstedt | 260/46.5 |
| 3,775,452 | 12/1973 | Karstedt | 260/429 R |
| 3,814,730 | 6/1974 | Karstedt | 260/46.5 |
| 4,256,870 | 3/1981 | Eckberg | 528/15 |
| 4,340,647 | 7/1982 | Eckberg | 428/429 |
| 4,421,783 | 12/1983 | Marwitz et al. | 427/54.1 |
| 4,433,007 | 2/1984 | Marwitz et al. | 427/54.1 |
| 4,465,818 | 8/1984 | Shirahata et al. | 528/15 |

*Primary Examiner*—Melvyn I. Marquis

[57] ABSTRACT

Addition curable silicone release compositions comprised of a vinyl-functional base polymer, a cross-linking agent, a precious metal catalyst, and an effective amount of $C_4$–$C_{30}$ α-olefins are provided which allow reduction in the amount of catalyst or allow the use of vinyl-containing polymers having a lower degree of functionality. The compatibility of the α-olefin additives allows the preparation of a wide range of serviceable release coating compositions at reduced cost and improved efficiency.

11 Claims, No Drawings

MODIFIED SILICONE RELEASE COATING COMPOSITIONS

FIELD OF THE INVENTION

This invention relates to modified curable polysiloxane compositions which are particularly well suited for release coating applications. Addition cure polysiloxane compositions containing effective amounts of α-olefins as modifiers radically reduce the catalyst load and toxicity of the compositions without affecting their performance as release coating compositions.

BACKGROUND OF THE INVENTION

Silicone compositions have long been used as release coatings, which are useful in many applications whenever it is necessary to provide a surface or material which is relatively nonadherent to other materials which would normally adhere thereto. Silicone release compositions are widely used as coatings which release pressure-sensitive adhesives for labels, decorative laminates, transfer tapes, etc. Silicone release coatings on paper, polyethylene, Mylar ®, and other such substrates are also useful to provide non-stick surfaces for food handling and industrial packaging applications. For example, when self-adhesive labels are mounted on paper backing, it is desirable that the paper backing be easily peeled away from the label when it is ready for use. At the same time, the adhesive quality of the label should not be reduced by its having been peeled away from the backing. The same principle applies to various adhesive tapes which are wound on spools: The tape must unroll easily and still maintain its adhesive quality. Silicone release compositions coated on the surface of the label mounting paper, or the nonadhesive side of the tape, will prevent, respectively, permanent adhesion of the label to the mounting paper, or adhesion of the tape to the nonadhesive side of the tape as it is rolled.

Silicone compositions previously developed as release coatings have had to be dispersed in solvent in order to control the coatings' viscosity and thereby aid their application to substrates. Use of solvents, however, entails the highly inefficient process step of evaporating the solvent, which requires large expenditures of energy and costly pollution controls.

Because of these drawbacks, there has been a growing need for solventless coating compositions which are easy to apply to substrates. Such solventless coating compositions are sometimes referred to as "100% solids" compositions. The absence of solvent lowers the amount of energy required to cure such compositions and eliminates the need for expensive pollution abatement equipment.

Previously developed solventless polysiloxane release coatings, however, still require high oven cure temperatures in the neighborhood of 300° F. minimum and are more expensive to use than solvent-dispersed or emulsion compositions. The high cure temperature requirement limits the usefulness of such coatings because only high-density papers or high melting point plastics and the like can be used as substrates without charring, melting or otherwise degrading during cure.

The higher cost of using solventless silicone release compositions stems from the nature of the curing reaction:

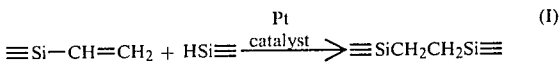

Linear vinyl-functional polysiloxane polymers, which are the main component in solventless silicone release compositions, undergo this hydrosilation addition reaction during cure. Effective migration-free cure is obtained when $\equiv Si-CH=CH_2$ content is no less than 3 or 4 mole percent of the polysiloxane polymer. Such vinyl substitution to set up the addition reaction shown at (I) is very expensive; and vinyl substitution paired with use of expensive platinum addition-cure catalysts is responsible for the high cost of using solventless grades.

U.S. Pat. No. 4,256,870 to Eckberg (incorporated herein by reference) discloses silicone release compositions which can be cured at temperatures as low as 200° F.; however, to effect an acceptable cure at these reduced temperatures, a large amount of platinum catalyst is required. For example, as much as eight times the amount of platinum (e.g., 200 ppm instead of 25 ppm) might be necessary for low temperature cure compared to that required for high temperature cure. Obviously, the high platinum concentration adds to the cost of such compositions, and there is consequently considerable current interest in limiting the level of required platinum without sacrificing low temperature cure performance.

In commonly assigned copending U.S. patent application Ser. No. 416,576, filed Sept. 10, 1982, incorporated herein by reference, unsaturated organic monomers such as α-olefins are employed as carrier diluents to assist in introducing high levels of vinyl MQ resins into solventless silicone release compositions. The reactive MQ resins act as controlled release additives, allowing adjustment of the release (i.e., the force in grams required to separate an adhesive from a substrate coated with a cured release coating) of the silicone release compositions.

It has now been discovered that a certain class of α-olefins can be added directly to solventless addition cure polysiloxane release coating compositions to yield compositions of equivalent curing characteristics and release properties, but with a significant reduction in the level of precious metal catalyst required and in the level of vinyl functionality on the polysiloxane base polymer chain required. The α-olefins are also uniquely compatible with the contemplated polysiloxane compositions in terms of solubility, cure compatibility, release compatibility, low volatility and low toxicity.

SUMMARY OF THE INVENTION

Accordingly, it is an object of the present invention to provide novel silicone release coating compositions which are less expensive to produce and use.

It is a further object of the present invention to provide addition cure polysiloxane release coating compositions which require less precious metal catalyst or less vinyl functionality in the polysiloxane base polymer.

It is a further object of the present invention to provide a modifying agent for silicone release coating compositions which is compatible with addition cure polysiloxane compositions in terms of silicone solubility, cure compatibility, release compatibility, low volatility, and which reduce the toxicity of said compositions.

These and other objects are accomplished herein by a silicone release coating composition comprising:

(A) an addition curable diorganopolysiloxane base polymer having up to about 20 weight percent alkenyl functional groups and having a viscosity of from about 50 to about 100,000 centipoise at 25° C.;

(B) a SiH-containing siloxane cross-linking agent having up to about 100 weight percent SiH-containing siloxy groups and having a viscosity of about 25 to about 1000 centipoise at 25° C.;

(C) an effective amount of precious metal catalyst to promote an addition cure hydrosilation reaction between said base polymer and said crosslinking agent; and (D) an amount of $C_4-C_{30}$ α-olefin or mixture of such olefins effective to enhance said addition cure.

As used herein, "enhance" as it refers to the addition cure hydrosilation reaction between the base polymer and the crosslinking agent of the present invention means that said cure is improved in terms of being carried out less expensively, reducing the amount of alkenyl functionality ordinarily necessary for satisfactory cure, reducing the amount of precious metal catalyst required to promote the addition cure, or otherwise advantageously affecting the addition cure reaction, for example, by solubilizing other additives (cure accelerators, cure inhibitors, etc.). A "satisfactory cure" will be familar to persons skilled in the art as signifying cure which yields a smear-free and migration-free coating on a given solid substrate.

DESCRIPTION OF THE PREFERRED EMBODIMENTS

The present invention provides silicone release coating compositions made up of several ingredients, including a diorganopolysiloxane base polymer, a hydride crosslinking agent, a precious metal hydrosilation catalyst, and α-olefin monomers or a mixture of monomers, which will thermally cure on a substrate to a tack-free, smear-free condition and render the substrate nonadherent (abhesive). The compositions may be solventless or dispersed in a solvent, as required by a particular user's needs. Ordinarily the crosslinking agent component will be held separate from the composition to prevent gellation, addition of the crosslinking agent at the time of use providing the coating composition; however, one-package systems are contemplated through the use of cure inhibitors, such as disclosed in the aforementioned U.S. Pat. No. 4,256,870.

The diorganopolysiloxane base polymers of the present invention are comprised of siloxane units having substituent groups including hydrogen atoms, lower alkyl radicals having up to about 8 carbon atoms such as methyl, ethyl, propyl, isopropyl, etc., and monovalent alkenyl radicals of from about 2 to 20 carbon atoms such as vinyl, allyl, butenyl, etc., including cyclo-alkenyl. These polymers are prepared by methods known in the art and are commercially available with varying degrees of functionality and having a viscosity ranging from approximately 50 to approximately 100,000 centipoise (cps) at 25° C.

Preferred diorganopolysiloxane base polymers of the present invention are vinyl-chainstopped diorganopolysiloxanes having the general formula

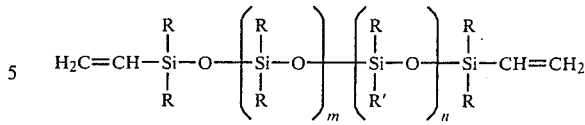

wherein R is, independently, a monovalent hydrocarbon radical free of unsaturation, such a methyl, ethyl, propyl, butyl, having up to about 8 carbon atoms; R' is a hydrocarbon radical having alkenyl unsaturation of from 2 to 20 carbon atoms; and m and n are positive integers such that the polymer has up to about 20% by weight R' groups. Most preferably the R groups will be methyl, the R' groups will be vinyl, and the viscosity of the polymers will range from approximately 300 to 600 cps at 25° C.

The SiH-containing polysiloxanes contemplated herein as crosslinking agents are comprised primarily of —R"$_2$SiO— units, where each R" is, independently, either hydrogen or a monovalent hydrocarbon radical of from 1 to 8 carbon atoms, with a sufficient number of R" groups being hydrogen to provide at least 1% by weight hydrogen (as hydrogen) per molecule. Such polysiloxanes will include, for example, cyclic polymers such as symtetrahydrotetramethylcyclotetrasiloxane, or linear polymers such as alkylhydrogensiloxane fluids or polydialkyl-alkylhydrogen siloxane copolymers. Particularly useful as crosslinking agents for the present invention are trimethyl-chainstopped polymethylhydrogen siloxane fluids having from approximately 10% to 100% SiH groups and having a viscosity in the range of about 15 to 1000 cps at 25° C.

The curing reaction which takes place between the vinyl-functional polysiloxane base polymer and the SiH— containing crosslinking agent is an addition cure reaction, also known as a hydrosilation. The compositions of the present invention may be thermally cured by means of a platinum catalyzed crosslinking reaction between the vinyl groups of the base polymer and the SiH reaction sites of the crosslinker.

Suitable hydrosilation catalysts to be employed in the present invention are known to persons skilled in the art and include platinum-metal catalysts utilizing such precious metals as ruthenium, rhodium, palladium, osmium, iridium and platinum, and complexes of these metals. Examples of such hydrosilation catalysts are described in U.S. Pat. No. 3,220,972 (Lamoreaux), U.S. Pat. No. 3,715,334 (Karstedt), U.S. Pat. No. 3,775,452 (Karstedt) and U.S. Pat. No. 3,814,730 (Karstedt), all of which are incorporated herein by reference.

The selection of the particular catalyst will depend upon such factors as speed of reaction desired, expense, useful shelf-life, useful pot-life and the temperature at which the cure reaction is to take place. The amount of catalyst employed is not critical, so long as proper crosslinking is achieved; however, as indicated above, the high cost of these precious metal catalysts makes their conservative use obligatory. As with any catalyst, it is preferable to use the smallest effective amount possible; for the coating compositions described herein, enough total catalyst is used to provide from about 10 to about 500 parts per million (ppm) of precious metal (as precious metal)

The α-olefins contemplated by the present invention are straight-chain hydrocarobons which contain a terminal double bond and may be characterized by the general formula, $CH_3-(CH_2)_x-CH=CH_2$, where x in an integer from 1 to 27, inclusive. Compounds of more than 30 carbons show decreasing solubility in the silicones of the present invention.

These α-olefins possess a number of properties which make them uniquely suited for the purposes herein: The α-olefins can be added directly to the silicone compositions to a level of about 40 percent by weight without significantly affecting the cure or release performance of the release coating composition, and the average cost per pound of α-olefins under 30 carbon atoms is about a tenth that of available vinyl-functional polysiloxanes; therefore, the savings realized by obtaining equal performance from compositions utilizing significantly less of the essential costly ingredients is seen to be very advantageous. Furthermore, the α-olefins contemplated are readily soluble in solventless silicone release coatings and form stable solutions. The high reactivity of the terminal double bond of the α-olefins in platinum catalyzed addition reaction allows the olefins to be used in solventless release coating compositions without adversely affecting cure. The effect of the α-olefins on release is also not significant, due probably to their linear hydrocarbon structure. The volatility of the α-olefins varies greatly depending on molecular weight, however for the preferred $C_{16}$-$C_{30}$ α-olefins, flash points range from 132° C. to 265° C. Finally, animal studies have shown that α-olefins have little or no toxic effect except where extensively inhaled; oral and dermal $LD_{50}$ values are in excess of 10 grams/kg (nontoxic), and skin and eye irritation are minimal. This combination of cost effectiveness, silicone solubility, cure and release compatibility, low volatility and low toxicity of α-olefins in silicone release coating compositions makes their use as modifiers according to the present invention extremely advantageous.

Additional ingredients may be added to the curable compositions described above to lend specific properties and allow the compositions to be tailored to a user's needs. For example, as indicated above, the coating compositions may be dispersed in a solvent or used in a 100% solids formulation, as required.

Other optional ingredients include cure inhibitors which serve to prevent premature cure in one-package systems and also extend the shelf-life of stored products and the pot-life of products in use. That is, at room temperature, the complete coating compositions will not gel prematurely, as often happens with catalyzed silicone compositions. Especially useful are the dialkyl carboxylic ester inhibitors such as diallylmaleate, diallylphthalate, and dimethylmaleate disclosed in the aforemention U.S. Pat. No. 4,256,870, which is incorporated herein by reference.

Another important additive for additon cure silicones is vinyl gum cure accelarators, such as those described in U.S. Pat. No. 4,340,647 (Eckberg), which is incorporated herein by reference. Adding from about 0.5 to about 10 weight percent (based on the total weight of the base polymer) of the vinyl gum reduces the minimum curing time.

Other conventional additives such as controlled release additives ("CRAs"), anti-microbial agents, antifoaming agents, and other additives familar to persons skilled in the art are also contemplated by the present disclosure.

The curable silicone release coating compositions of the present invention will cure to a tack-free, smear-free condition on brief exposure to temperatures in the range of, e.g., 90° to 300° C. A heat cure reaction can be initiated in many ways such as by infrared lamps or by radiation, but typically a forced air oven is most suitable. The compositions of the present invention can be applied to substrates in many ways such as by coating, spraying, brushing and application by blade or gravure processes. The present invention thus provides a method for rendering surfaces abhesive by application of the present coating compositions to a suitable substrate. Such substrate include glass, metal, oil, paper, polyethylene coated kraft (PEK) paper, super-calendered kraft (SCK) paper, polyethylene films, polypropylene films and polyester films.

In order that those skilled in the art might be better able to practice the present invention, the following examples are given by way of illustration and not by way of limitation.

EXAMPLES 1-4

Sample 1

450 parts by weight of a dimethylvinyl-chainstopped polydimethylsiloxane fluid, 50 pbw of a mixed $C_{16-18}$ α-olefin (Gulf Oil Chemicals Co.), 30 pbw of a 7800 penetration vinyl gum, 0.48 parts by weight of a platinum-olefin complex catalyst, and 0.40 pbw dimethylmaleate were charged to a closed top glass container. The blend was mixed 16 hours at room temperature to yield a clear fluid according to the present invention having a viscosity of about 810 cps.

Using the same basic ingredients and procedures as in Sample 1, the following two compositions were prepared:

Sample 2

Dimethylvinyl-chainstopped polydimethylsiloxane fluid, 400 pbw;
$C_{16-18}$ α-olefin, 100 pbw;
7800 penetration vinyl gum, 40 pbw;
platinum complex catalyst, 0.84 pbw;
dimethylmaleate, 0.70 pbw.
Composition: Clear fluid having a viscosity of 764 cps.

Sample 3

Dimethylvinyl-chainstopped polydimethyl siloxane fluid, 350 pbw;
$C_{16-18}$ α-olefin, 150 pbw;
7800 penetration vinyl gum, 50 pbw;
platinum complex catalyst, 1.20 pbw;
dimethylmaleate, 1.00 pbw.
Composition: Clear fluid having a viscosity of 732 cps.

A further sample was prepared using a grade of dimethylvinyl-chainstopped polydimethylsiloxane fluid, 225-375 cps viscosity, which was previously not preferred for use in commercial premium release compositions.

Sample 4

167.4 parts by weight (pbw) of the PDMS fluid, 36 pbw 7800 penetration vinyl gum and 97 pbw $C_{16-18}$ α-olefin were added to a reaction vessel. The blend was agitated until the vinyl gum was completely dissolved, about 2 hours. The mixture was then cooled to 50° C. and 1.8 pbw platinum complex catalyst and 1.5 pbw dimethylmaleate were added and mixed for 1 hour until uniform. The final product was a clear fluid having 940 cps viscosity.

The four samples were tested for cure and release:

Coating baths containing Samples 1-4 were prepared by adding 20 pbw of each sample to 80 pbw of hexane, then adding 4.5 weight percent of a polymethylhydrogensiloxane crosslinking fluid. The baths were applied to 40-lb. SCK substrates with a #3 Mayer rod and oven cured at about 93°-94° C.

Complete cure is characterized by the absence of smear, rub-off and migration of the coating. Smear and rub-off are determined by firmly sliding a finger across the cured sheet and visually observing smear or removal of the coating. Migration is determined by applying and removing Scotch ® 610 tape, noting any loss in the tape's adhesion (from picking up part of the abhesive surface).

The following cure times (seconds to obtain complete cure) were observed:

| Composition: | Control* 4 wt. % | Sample 1 4 wt. % | Sample 2 4 wt. % | Sample 3 4 wt. % | Sample 3 5 wt. % | Sample 4 4 wt. % |
|---|---|---|---|---|---|---|
| Crosslinker: | | | | | | |
| Cure Time (sec.) | 40 | 40 | 40 | 50 | 40 | 50 |

*General Electric grade SS4310, utilizing same polysiloxane base polymer, catalyst, vinyl gum and inhibitor as Samples 1, 2 and 3 but without any α-olefins.

All of the coatings fully cured to smear-and migration-free abhesive surfaces, showing that the addition of α-olefins does not detract from the cure of conventional systems (i.e., Control).

Release was tested by applying the coating baths to 40-lb. SCK paper, curing at about 121° C. for 30 seconds, then preparing laminates by applying a rubber based adhesive over the coated substrate and pressing SCK paper onto the adhesive layer. The laminates were then cut into two-inch strips and pulled apart at a 180° angle at 400 inches/minute. The release in grams required to separate the adhesive and abhesive lamina under these conditions was recorded, as follows:

| | Release (grams) | | | | |
|---|---|---|---|---|---|
| | Control | Sample 1 | Sample 2 | Sample 3 | Sample 4 |
| Initial | 30-40 | 30-45 | 35-50 | 30-50 | 50-70 |
| 48 hr. | 20-30 | 20-35 | 25-40 | 20-40 | 30-45 |
| 1 week | 20-30 | 25-40 | 30-40 | 25-40 | — |
| 2 week | 15-25 | 20-35 | 20-35 | 20-35 | 30-59 |

The coating baths used to measure release were similar to the bath formulations used to check cure, except in this case 0.8 gr. of crosslinking fluid was used.

The release data show that the addition of α-olefin does not significantly alter the release of the control. Sample 4 has higher release than the others probably because of the higher level of α-olefin and higher starting viscosity.

EXAMPLES 5-7

Further compositions were prepared using vinyl-terminated polydimethylsiloxane (PDMS) fluids, having viscosities in the range of 225-375 cps. The following formulations were prepared:

Sample 5

251.5 parts by weight (pbw) of a vinyl-terminal PDMS fluid, 28.3 pbw $C_{16-18}$ α-olefin and 17 pbw of 7800 penetration vinyl gum were added to a reaction vessel and agitated at 150° C. until the gum dispersed. The blend was cooled to less than 60° C. at which point 150 ppm platinum in the form of a platinum-olefin complex and 2.0 pbw dimethylmaleate were added.

Sample 6

Under the same conditions as with Sample 5, 219 pbw vinyl-terminated PDMS fluid, 55.4 pbw $C_{16-18}$α-olefin and 22.2 pbw vinyl gum were blended and dispersed. The same amounts of catalyst and inhibitor were added.

Sample 7

Under the same conditions as previous samples, 188 pbw vinyl-terminated PDMS fluid, 81.5 pbw $C_{16-18}$α-olefin and 27.2 pbw vinyl gum were blended and dispersed. The same amounts of catalyst and inhibitor were added.

These formulations provide coating compositions according to the present invention.

Modifications and variations in the present invention are obviously possible in light of the foregoing disclosure. For example, the 100% solids coating compositions disclosed above may be dispersed in an organic solvent (or mixture of solvents) such as hexane, toluene, naphtha, xylene, benzene, etc. It is understood, however, that any incidental changes made in the particular embodiments of the invention as described herein are within the full intended scope of the appended claims.

What is claimed is:

1. A solventless silicone release coating composition comprising:
(A) an addition curable alkenyl functional diorganopolysiloxane base polymer having up to about 20 percent by weight alkenyl functional groups and having a viscosity of from about 50 to 100,000 cps at 25° C.;
(B) a SiH-containing polysiloxane crosslinking agent having up to about 100 percent by weight SiH-containing siloxy groups and having a viscosity in the range of about 15 to 1000 cps at 25° C.;
(C) an effective amount of precious metal or precious metal complex catalyst to promote an addition cure hydrosilation reaction between said base polymer and said crosslinking agent; and
(D) an amount of α-olefin, or a mixture of olefins, having up to about 30 carbon atoms, effective to enhance said addition cure.

2. A composition as defined in claim 1, wherein said α-olefins are linear hydrocarbons of the formula, $CH_3-(CH_2)_x-CH=CH_2$, wherein x is a positive integer of from 1 to 27, inclusive.

3. A composition as defined in claim 2, wherein x is a positive integer of from 13 to 27, inclusive.

4. A composition as defined in claim 1, wherein said diorganopolysiloxane has the formula

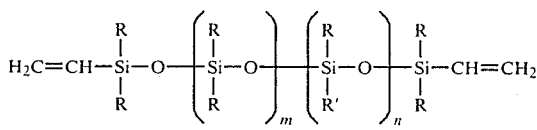

wherein R is, independently, a monovalent hydrocarbon radical free of unsaturation having up to about 8 carbon atoms; R' is a hydrocarbon radical having alkenyl unsaturation of from 2 to 20 carbon atoms; and m and n are positive integers such that said diorganopolysiloxane has up to about 20% by weight R' groups.

5. A composition as defined in claim 4, wherein said diorganopolysiloxane is a dimethylvinyl-chainstopped polydimethylsiloxane, dimethylvinyl-chainstopped polydimethyl-methylvinyl siloxane copolymer, or a mixture thereof.

6. A composition as defined in claim 4, which also includes at least 1 additional component selected from the group consisting of
(i) an amount of dimethylvinyl-chainstopped polydimethyl-methylvinylsiloxane copolymer gum having an average molecular weight of about 200,000–400,000 effective for accelerating the cure of said addition curable composition;
(ii) an amount of dialkyl carboxylic ester effective to inhibit the precious metal catalyzed hydrosilation cure reaction of said silicone composition at temperatures below the heat cure temperature of the composition;
(iii) controlled release additive;
(iv) anti-microbial agent; and
(v) anti-foaming agent.

7. A composition as defined in claim 6, wherein said crosslinking agent is a polymethylhydrogen siloxane fluid having at least 1 weight percent hydrogen as hydrogen.

8. A composition as defined in claim 7, wherein said precious metal catalyst is present in an amount sufficient to provide 10 to 500 ppm of precious metal.

9. A composition as defined in claim 8, wherein said $\alpha$-olefin or mixture is comprised of $C_{16}$–$C_{30}$ $\alpha$-olefins.

10. A composition as defined in claim 9, wherein said $\alpha$-olefin component is present in an amount of up to about 40 percent by weight of the total composition.

11. A composition as defined in claim 1, wherein said $\alpha$-olefin or mixture of $\alpha$-olefin is comprised of $C_4$ to $C_{30}$ $\alpha$-olefins.

* * * * *